Patented June 12, 1945

2,378,368

UNITED STATES PATENT OFFICE 2,378,368

PRODUCTION OF HYDRIDES OF ALKALINE EARTH METALS

Peter P. Alexander, Marblehead, Mass., assignor to Metal Hydrides Incorporated, Beverly, Mass., a corporation of Massachusetts No Drawing. Application July 1, 1941,
Serial No. 400,687

8 Claims. (Cl. 23—204)

This invention relates to a method for the production of hydrides of the elements of the second group of the periodic table of chemical elements.

It has been known in the art that hydrogen combines with the elements of that group while at red heat and forms hydrides. Yet until now these compounds have been produced on a comparatively small scale and by very wasteful methods. However, the growing demand for some of these metal hydrides in larger quantities and at a much lower price necessitated the development of a new method which can be carried out economically on a factory scale, with a reduction in labor and used energy to an absolute minimum. The elimination of waste material was also a very important problem.

The first commercial method and the only one used on a fairly large scale was developed and patented by G. F. Joubert and Electrochemische Werke, Bitterfeld (German Patent #188,570, 1905). In that process metallic calcium was fused in a suitable vessel and hydrogen gas was blown through until the whole mass was transformed into calcium hydride. Although this method is comparatively simple yet it is extremely wasteful since a considerable amount of calcium is oxidized or otherwise wasted. The average analysis of the product produced was only 90% calcium hydride and the remaining 10% consisted of calcium oxide and nitride with a certain amount of calcium carbide, because molten calcium readily combines with all the gases present in the hydrogen as impurities. Furthermore, the molten calcium hydride had to be poured out, and if this operation was carried on in an atmosphere containing either oxygen or nitrogen, considerable losses were incurred. If, on the other hand, the molten calcium hydride was left to cool and solidify in the converter it had to be broken up with crowbars and involved considerable labor and losses due to the production of fine chips and powders which were rapidly decomposed in air.

The production of calcium hydride by a modified process involving the heating in a hydrogen atmosphere of metallic calcium in the furnace to red heat improved somewhat the Joubert process but did not eliminate considerable waste and a large amount of labor. The material is melted during that operation due to the evolution of heat during the reaction which readily raises the temperature above 810° C., at which temperature all the remaining calcium melts. The resulting solid cake after cooling from 900° C. or higher to room temperature has to be broken up with hammers and crowbars to permit its removal from the containing vessels.

Since in the processes described in various patents granted to the applicant, large amounts of calcium hydride have to be used, continuous improvements in the methods of production of that material were carried out until the present described process was evolved.

My method is based on the fact that alkaline earth metals begin to absorb hydrogen at temperatures only slightly above 300° C. Furthermore, the formation of hydrides always results in the evolution of a large amount of heat. For instance, when hydrogen combines with calcium the heat of formation is 45,880 calories per mol. In the case of barium the heat of formation is 40,860 calories per mol.

My method is also based on the fact that these elements begin to combine with different gases at different temperatures. Calcium, for instance, combines with hydrogen at 400° C. Yet it does not react at all either with dry carbon dioxide or carbon monoxide until a higher temperature is reached. The process therefore is carried out preferably under conditions where the temperature is kept only slightly below that at which the hydrogen combines with that particular element.

I also found that calcium heated in a gaseous mixture of hydrogen, carbon monoxide and carbon dioxide will absorb at low temperature only hydrogen, and will form calcium hydride just as if it were treated in pure hydrogen.

Such results are absolutely impossible to obtain with older methods of production of calcium hydride where the temperature is allowed to rise to red heat and melt the calcium.

The apparatus which I use for the production of calcium hydride consists of a cylindrical retort of about eighteen inches in diameter surrounded by a brickwork 9" in thickness which forms a muffle around the retort to regulate the dissipation of the heat generated in the retort. Between the retort and the brickwork there is an air space. The apparatus is further provided with a gas torch and a nozzle through which cold compressed air can be blown if the temperature of the retort rises above 500° C. Therefore the retort can be either heated by the flame from the torch or cooled by the blast of cold air. The dissipation of heat however is so regulated that the heat of formation is just sufficient to maintain the desired temperature and yet never overheat the materials.

In the production of calcium hydride in large lots it is necessary to use large ingots of the same size as they come from the electrolytic plant which eliminates the labor of cutting them into smaller pieces. These large ingots, in one practice of the invention, are placed in the retort in which the air is replaced with hydrogen and part of the vessel is heated externally so as to start the reaction. The instant metallic calcium in the bottom of the retort is brought to about 400° C. or slightly higher by the use of a gas torch it begins to absorb hydrogen which is continuously supplied to the retort. The absorption of hydrogen by one of the ingots or part of the ingots results in the elevation of the temperature in that part of the retort due to the heat of reaction. The adjacent ingots then begin to react with hydrogen with a further generation of heat. The application of external heat is discontinued after a few minutes of application and the reaction proceeds by itself.

If the retort is properly designed, that is if it has a sufficient area of radiation, the generated heat inside of the retort, for example, will be just sufficient to raise the temperature to 400–500° C. and not to exceed it.

Once the equilibrium between the heat generated in the retort and the heat dissipated by the external surface of the retort is reached, the reaction proceeds automatically and without any additional labor or supervision whatsoever. The hydrogen is absorbed gradually since it has to diffuse through a solid layer of previously formed calcium hydride which eliminates the possibility of an inrush of the gas and overheating of the material above the melting point of calcium metal. The hydrogen is supplied automatically from tanks or the manifolds. The complete diffusion of hydrogen through the solid blocks of calcium and their complete conversion to calcium hydride requires several hours, usually eighteen to twenty-four. When all the calcium is converted into calcium hydride there is no more generation of heat and the retort and its contents cool to room temperature which is an indication that the reaction is completed and the retort is ready to be loaded with a new charge.

The advantages of my process are as follows. Large ingots of any irregular shape can be treated with an absolute minimum of labor. The amount of energy necessary is insignificant and limited simply to the amount necessary to start the reaction which could be compared to lighting a wood-pile with a match. For such a low temperature treatment, retorts of very cheap material, such as boiler plate could be used. Since there is no fusion there is no contamination of the product produced with the materials in the retort or by the walls of the retort. If the temperature is kept sufficiently low, that is below 600° C., impure hydrogen may be used since hydrogen will be absorbed selectively. The property of selective absorption can be used as a method of extraction of pure hydrogen from mixed gases and hydrocarbons.

In the manufacture of calcium hydride, for example, a charge of calcium in the form of ingots, is advantageously confined in a container filled with hydrogen. Part of the charge in the container is heated until the hydrogen begins to react with the heated part of the charge. The application of external heat to the container is then discontinued and the temperature of the charge is regulated by appropriate dissipation of heat to maintain the charge between 300° C. and 750° C. In a modified practice, the ingots of calcium metal may be placed upon a conveyor and moved through a furnace, provided with a hydrogen atmosphere, at a speed sufficient to heat the surface of the ingots to a temperature between 300° C. and 750° C. The ingots are then moved into a cooler zone of the furnace where radiation of heat generated inside of the ingots is regulated to maintain the temperature of the charge between 300° C. and 750° C.

What I claim as new and desire to secure by Letters Patent of the United States, is:

1. In the method of producing alkaline earth metal hydrides by reacting an alkaline earth metal with hydrogen gas in a reaction zone at an elevated temperature, the improvement which comprises heating a body of the alkaline earth metal of substantial size with applied heat in the absence of air and in the presence of a limited amount of the hydrogen gas in the reaction zone to a temperature sufficiently high to cause the hydrogen to begin to combine with the alkaline earth metal to form the desired alkaline earth metal hydride but insufficiently high to cause the alkaline earth metal to fuse, said hydrogen gas initially present in the reaction zone being insufficient in amount when combined with the alkaline earth metal to generate heat greatly in excess of that dissipated from the reaction zone to prevent fusion of the alkaline earth metal by the heat of formation, gradually feeding regulated amounts of hydrogen gas into the reaction zone as the conversion of the alkaline earth metal to its hydride progresses and thereby controlling the rate of formation of the alkaline earth metal hydride in such manner that the hydrogen gas diffuses through the alkaline earth metal hydride already formed toward the interior of the body of alkaline earth metal and that a temperature is maintained in the reaction zone below that at which the alkaline earth metal fuses but at which the conversion takes place substantially wholly by the regulation of the amounts of hydrogen gas thus fed into the reaction zone, cooling the resulting alkaline earth metal hydride, and removing the alkaline earth metal hydride from the reaction zone in its unfused condition.

2. Method according to claim 1, in which the alkaline earth metal is in the form of ingots.

3. Method according to claim 1, in which the hydrogen gas contains a gaseous impurity selected from the group: carbon monoxide, carbon dioxide and hydrocarbons, and conducting the conversion of the alkaline earth metal to its hydride at a temperature below that at which the gaseous impurity reacts objectionably with the alkaline earth metal.

4. Method according to claim 1, in which the alkaline earth metal is in the form of metallic calcium.

5. Method according to claim 1, in which the alkaline earth metal is in the form of ingots of metallic calcium.

6. Method according to claim 1, in which the alkaline earth metal is in the form of metallic calcium, and the hydrogen gas contains a gaseous impurity selected from the group: carbon monoxide, carbon dioxide and hydrocarbons, and conducting the conversion of the calcium to its hydride at a temperature below that at which the impurity reacts objectionably with the calcium.

7. A method of production of calcium hydride which comprises confining a charge of ingots of calcium metal in a metallic container filled with hydrogen, heating part of the charge in the container externally until the hydrogen begins to react with the heated part of the charge, discontinuing further external heating of the charge and regulating the temperature to maintain it between 300° C. and 750° C.

8. A method of production of calcium hydride comprising placing ingots of calcium metal on a conveyor, moving the calcium through a furnace provided with a hydrogen atmosphere at a speed sufficient to heat the surface of the ingots to a temperature above 300° C. but below 750° C., further moving the ingots into a cooler zone of the furnace and regulating the radiation of heat generated inside of the ingots to maintain the temperature of the charge between 300° C. and 750° C.

PETER P. ALEXANDER.